April 5, 1932.  J. A. TEAS  1,852,381

CABLE CLAMP

Filed April 7, 1930

Inventor
John A. Teas
by Orwig & Hague, Attys.

Patented Apr. 5, 1932

1,852,381

UNITED STATES PATENT OFFICE

JOHN A. TEAS, OF DES MOINES, IOWA

CABLE CLAMP

Application filed April 7, 1930. Serial No. 442,158.

The object of my invention is to provide a simple, durable and inexpensive device which is especially adapted to be used for the purpose of supporting electric cables within their conduits.

More specifically it is the object of my invention to provide a device which may be attached to the upper ends of vertically arranged conduit in such a manner that cables mounted in said conduit may be held against downward movement.

A still further object is to provide a clamp for electric cables which are used in vertically arranged conduits, so constructed that the clamp may be attached to or detached from the cables after they have been mounted in position within the said conduits.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figures 1, 3:
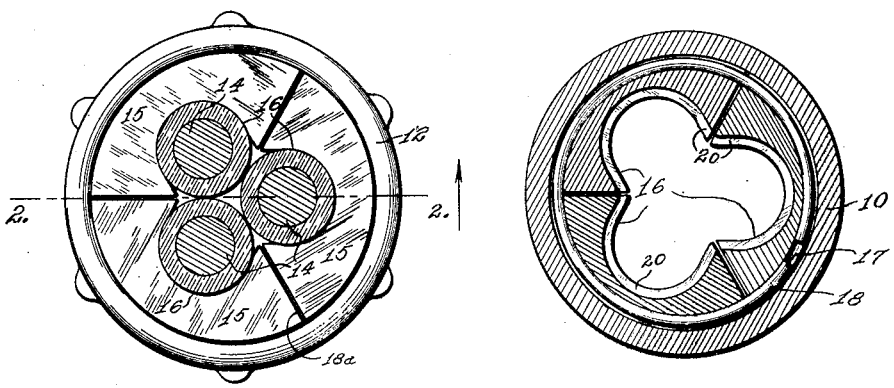
Figure 1 is an elevation of my improved cable clamp showing the manner in which cables are secured therein, said cables being shown in section.
Figure 3 is a transverse sectional view taken on the line 3—3 of Figure 2.

The numeral 10 indicates the upper end of a metallic conduit such as is generally used in connection with running electric wires through the partitions and etc. of buildings.

These tubes are generally provided with screw threaded portions 11 at their upper ends. The conduits to which my device is particularly adapted are generally mounted vertically, and sometimes are of a considerable length, and are designed to carry comparatively heavy cables.

In cases of this kind considerable difficulty has been experienced in holding the cables in position in the conduits to prevent the weight of the said cables from injuring the insulation of the cables at points where the said cables are bent at the upper end of the conduits and are in horizontal positions.

To support a portion or all of the weight of the cables, I have provided the following arrangement, which comprises a cap member 12, which is screw threaded and designed to be mounted on the screw threaded portion 11. This cap member is provided with an opening 13 substantially of the same diameter as the inside of the conduit 10, and is provided with a rounded upper edge.

In the drawings, I have shown my preferable construction applied to a cable having three strands of insulated wire, which are indicated by the numeral 14. The clamp comprises three wedge members 15 designed to lie adjacent to each other, and having their faces arranged radially, as shown in the plan view, each of which is substantially one-third of a cylinder, the outside of the said cylinder being formed somewhat tapered and its upper end larger than its lower end, to form sort of a wedge designed to enter the opening 13 of the member 12.

Figure 2:
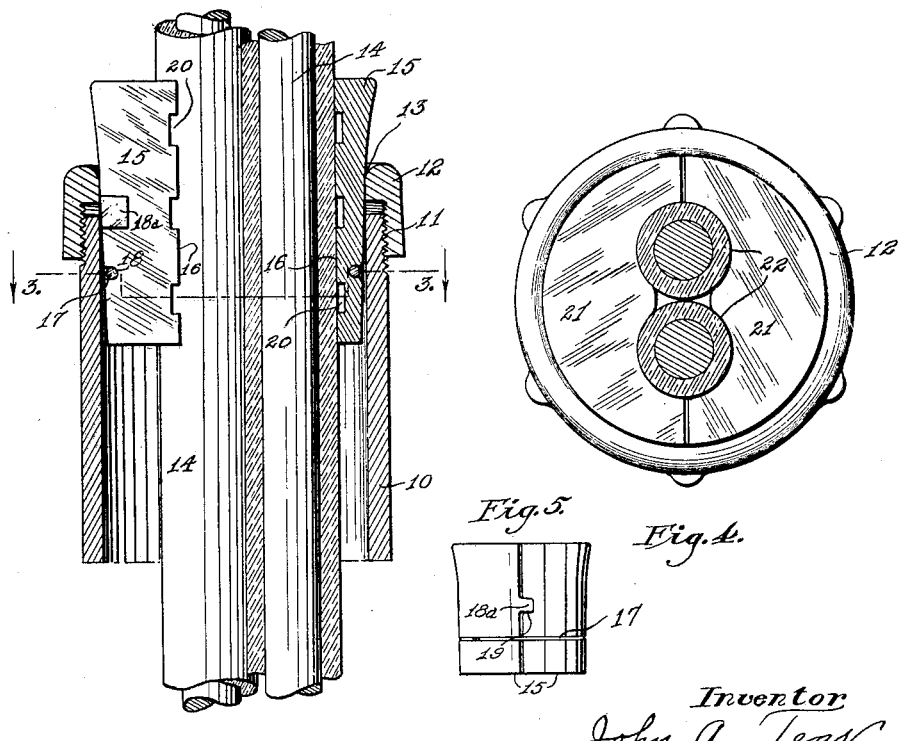
Figure 2 is a vertical sectional view taken on the line 2—2 of Figure 1.

The inner side of each of the members 15 is provided with a central and longitudinal groove 16 which is of a diameter equal to the diameter of the cable member which it is designed to receive. These blocks 15 are held in position relative to each other in a cylindrical form by means of a spring ring member 17 mounted in a groove 18 in the periphery of the cylindrical member, as clearly shown in Figures 2 and 3. The members 15 are held against longitudinal movement relative to each other by a lug 18a mounted on one face of one of the members 15 and entering a groove 19 in the adjacent face of the adjoining member 15.

The inner faces of the groove 16 are provided with annular grooves 20 which are for the purpose of forming grips to prevent the cables from slipping within the wedge members 15.

The practical operation of my cable clamp is as follows:

Assuming that the cables 14 have been strung through the conduit 10, and it is desired to clamp them in position, and that the member 12 is in position on the top end of said conduit, the operator grasps one of the members 15 and presses it against one of the cables 14 into the groove 16. He then grasps the other members 15 and likewise presses them in position with the lugs 18a in the grooves 19. The spring 17 is then placed in position over the lower end of the members 15, and moved upwardly until it enters the groove 18. This groove is of a depth slightly greater than the diameter of the spring member 17.

The members 15 may then be driven downwardly or forced downwardly until they enter the opening 13 of the member 12. The top ends of the members 15 may be then tapped gently with a hammer until they have securely gripped the cables 14.

Thus it will be seen that any downward movement of the said cables will have a tendency to cause them to grip tighter and will support the weight of the same upon the member 12.

When it is desired to remove the cable, a slight upward movement of the said cables will at once cause the members 15 to disengage the member 12 so that the clamps may be easily and quickly moved.

Figures 4, 5:
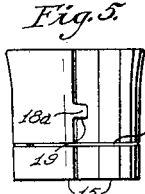
Figure 4 is a plan view showing a modified form of my device.
Figure 5 is a side elevation of the wedge member of my improved device.

In Figure 4 I have shown a slightly modified form of the device which is adapted to be used for a cable having two strands of wire, and comprises wedge members 21 similar to the members 15 with the exception that the inner faces are provided with double grooves 22 instead of a single groove.

It will also be seen that the device might be applied to a cable having more than three strands by making the conical member into a number of blocks equal to the number of strands in the cable.

I claim as my invention:

1. A cable clamp comprising an annular cap member, a tapering cylindrical member for said annular member formed of a series of independent and longitudinal segments, each of said segment being provided with a longitudinal and central groove, one of the coacting faces of each segment being provided with a rib designed to coact with a groove in the adjacent face of the adjoining segment, and yieldable tension means for binding all of said segments together when removed from said annular member.

2. A cable clamp comprising an annular cap member, a tapering cylindrical member for said annular member formed of a series of longitudinal segments, each of said segments being provided with a longitudinal and central groove, one of the coacting faces of each segment being provided with a rib designed to coact with a groove in the adjacent face of the adjoining segment, and means for binding all of said segments together when removed from said annular member, said means comprising an annular groove in the said cylindrical member, and a yieldable member for said groove.

3. The combination of an electric conduit having a cable provided with a number of wires, an annular cap member for one end of said conduit, a tapering and cylindrical wedge member for said annular member formed of a series of longitudinal segments, the number of which are equal to the number of wires in said cable, each of said segments being provided with a groove to receive one of said wires, and means for preventing longitudinal movement of said segments relative to each other.

4. The combination of an electric conduit, having a cable provided with a number of wires, an annular cap member for one end of said conduit, a tapering and cylindrical wedge member for said annular member formed of a series of longitudinal segments, the number of which is equal to the number of wires in said cable, each of said segments being provided with a groove to receive one of said wires, and means for preventing longitudinal movement of said segments relative to each other, and yielding means for holding said segments together when the cylindrical member is removed from the annular member.

5. The combination of an electric conduit having a cable provided with a number of wires, a tapering and cylindrical wedge member for said conduit formed of a series of longitudinal segments, the number of which is equal to the number of wires in said cable, each of said segments being formed with a groove to receive one of said wires, means for preventing longitudinal movement of said segments relative to each other, and yieldable means for holding said segments together when the cylindrical member is removed from the conduit.

6. A cable clamp comprising a tapered cylindrical member formed of a series of independent longitudinal segments, each of said segments being provided with a longitudinal and central groove, the outer surface of said segments being provided with annular grooves, and a circular yieldable tension member for said grooves whereby all of the segments will be yieldably bound together.

7. A cable clamp comprising a tapered cylindrical member formed of a series of independent longitudinal segments, each of said segments being provided with a longitudinal central groove, and yieldable means for binding all of said segments together.

Des Moines, Iowa, May 23, 1921.

JOHN A. TEAS.